United States Patent [19]

McCorsley, III

[11] 4,144,080
[45] Mar. 13, 1979

[54] PROCESS FOR MAKING AMINE OXIDE SOLUTION OF CELLULOSE

[75] Inventor: Clarence C. McCorsley, III, Asheville, N.C.

[73] Assignee: Akzona Incorporated, Asheville, N.C.

[21] Appl. No.: 819,082

[22] Filed: Jul. 26, 1977

[51] Int. Cl.² .............................................. C08L 1/02
[52] U.S. Cl. ..................................... 106/186; 106/198
[58] Field of Search ............... 106/186, 198, 125, 189; 8/189; 264/13, 188

[56] References Cited

U.S. PATENT DOCUMENTS

| | | | |
|---|---|---|---|
| 2,179,181 | 11/1939 | Graenacher et al. | 8/35 |
| 3,503,700 | 3/1970 | Griggs | 8/189 |
| 3,647,493 | 3/1972 | Gresch et al. | 106/198 |

*Primary Examiner*—Theodore Morris
*Attorney, Agent, or Firm*—Francis W. Young; Jack H. Hall; Clelle W. Upchurch

[57] ABSTRACT

A process is provided for making a solution of cellulose in an amine oxide. In accordance with one aspect of the invention, a solid precursor of a solution of cellulose in a tertiary amine oxide in the form of a chip or the like which has been prepared by suspending cellulose in a mixture containing a tertiary amine oxide and water is heated in the barrel of an extruder to dissolve the cellulose, and the resulting solution is extruded to provide an extrudate adapted to be shaped into a cellulosic product. In another aspect, a tertiary amine oxide solvent for cellulose can be added directly to the extruder where mixing and dissolution take place under the application of heat and pressure. It is further advantageous, in either case, where a non-solvent for the cellulose, compatible with the tertiary amine oxide and water, is employed.

16 Claims, 2 Drawing Figures

PROCESS FOR MAKING AMINE OXIDE SOLUTION OF CELLULOSE

This invention relates generally to cellulose and, more particularly, to a process for making a solution of cellulose in amine oxide, which is adapted to be shaped and precipitated into a cellulosic product such as a fiber filament.

A process for dissolving cellulose in a tertiary amine oxide is disclosed in U.S. Pat. No. 2,179,181. In accordance with the disclosed process from 7% to 10% by weight of cellulose is dissolved in 93 to 90% by weight of a tertiary amine oxide to form a viscous liquid from which the cellulose may be precipitated by pouring or spinning the liquid in water, alcohol, or dilute acid. The tertiary amine oxides suitable for practicing the disclosed process contain 14 or less carbon atoms and may be an oxide of a trialkyl amine or an alkylcycloaliphatic tertiary amine. The resulting solution has the disadvantage of having a low solids content and a high viscosity.

Another process for dissolving cellulose in a tertiary amine oxide is disclosed in U.S. Pat. No. 3,447,939. A cyclic mono(N-methylamine-N-oxide) such as N-methylmorpholine-N-oxide is used as the solvent. The resulting solutions may be used to dissolve the surface of a material to form an adhesive coating or it can be cast into a film. The solutions have much the same disadvantages of those prepared by the process disclosed in U.S. Pat. No. 2,179,818 because they are also of low solids content and have a high viscosity.

In accordance with the process disclosed in U.S. Pat. No. 3,508,941, two or more different polymers are dissolved in a cyclic mono(N-methylamine-N-oxide) compound and are precipitated together to produce a random copolymer. A diluent such as dimethyl sulfoxide, N-methyl-pyrrolidone or sulfolane may be added to the solution to reduce its viscosity. The solutions may be cast into films or shaped into filaments. As indicated by the Examples set forth in the patent, only low solids solutions can be prepared when cellulose is one of the compounds used in the preparation of the solution.

It is an object of this invention to provide a solution of cellulose in an amine oxide which is suitable for making shaped articles of cellulose. Another object of the invention is to provide a process for making a solution of cellulose in amine oxide from comminuted solid cellulose chips which contain amine oxide and can be heated to convert the mixture into a solution of cellulose in amine oxide. Still another object of the invention is to provide a method for making an air-free solution of cellulose in an amine oxide which has a high solids content and correspondingly high viscosity which are difficult or impossible to process using conventional techniques used in making films, fibers, and yarns of cellulose. According to an object of the invention, a cellulose-amine oxide solution is provided that is adapted to be extruded and spun. A still further object of the invention is to provide a method for dissolving cellulose in amine oxide and water to provide a dope of substantially uniform composition which is adapted for making shaped cellulose products such as films and fibers.

Other objects will become apparent from the following description with reference to the accompanying figures wherein.

Figure 1:
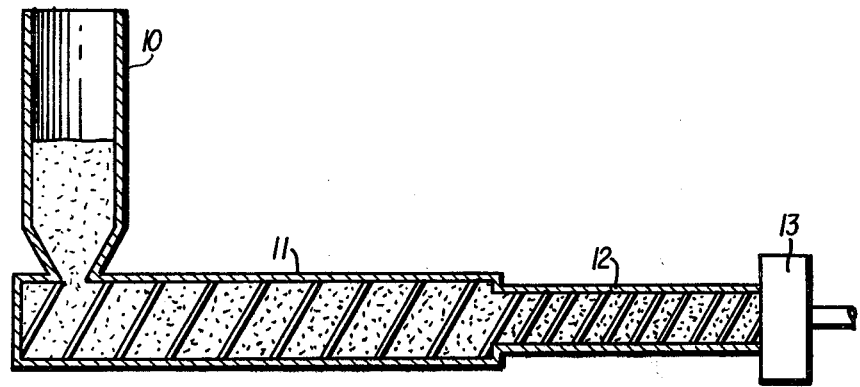
FIG. 1 illustrates diagrammatically one embodiment of an apparatus which may be used in practicing the process of the invention.

The foregoing objects and others are accomplished in accordance with the invention, generally speaking, by providing a process wherein a comminuted solid precursor of a solution of cellulose in amine oxide is charged to an extrusion apparatus, is heated to a temperature where the amine oxide dissolves the cellulose to form an extrudable solution of cellulose and the resulting solution is extruded through a die to form an extrudate of substantially uniform composition. The cellulose containing absorbed amine oxide solvent may be comminuted if it is not already in particulate form and charged to the barrel of an extruder where it is heated to a temperature where the cellulose dissolves. The resulting dope is then extruded.

The raw material to be used in practicing the invention may be prepared by a process which produces a solid cellulose product containing sufficient amine oxide to dissolve the cellulose simply by heating the product. The cellulose fibers may be swollen by including a non-solvent for cellulose in the amine oxide so solutions of higher solids content than those of discussed prior art can be prepared. The non-solvent may be water or a mixture of water and an organic non-solvent for cellulose miscible with water.

One suitable process for preparing cellulose containing amine oxide and water which can be converted into a dope which is suitable for shaping into films and filaments in accordance with this invention is disclosed in application Ser. No. 819,080 filed by McCorsley and Vargas on the same date as this application (Attorney's Docket No. EC14015), the disclosure of which is incorporated herein by reference. In accordance with the process disclosed in that application, cellulose is mixed with a solution of a liquid amine oxide and water with or without a miscible liquid organic non-solvent for cellulose in such proportions and under such temperatures and pressure conditions that there will not be any substantial dissolution of the cellulose in the amine oxide. The resulting suspension is steeped at such a temperature until the cellulose absorbs amine oxide in an amount to dissolve the cellulose when heated later. The non-solvent or mixture of non-solvent and amine oxide swell the fibers of cellulose facilitating the absorption of the amine oxide and making it possible to prepare a product adapted to be converted with heat into a solution of higher solids than those produced by the prior art process. Any organic non-solvent which has been used must be removed and the water must be reduced to about 1 mole or less per mole of amine oxide. According to said application, this can be accomplished by completing the mixing under a vacuum following by drying.

Best results are obtained if the dried product contains from about 10% to about 40% by weight cellulose, 0 to 20% by weight water and about 90% to 50% by weight amine oxide. The resulting solid product may be comminuted such as by grinding or chopping to form fragments or chips which are stored for immediate or later conversion in accordance with the present invention into a solution.

The solid product may now be fed to an extruder and heated to dissolve the cellulose in the amine oxide-water mixture. The resulting solution is then extruded. The preferred temperature range in the barrel of the extruder for dissolving the cellulose is from about 90° C. to about 140° C. The extruder may be operated at any suitable screw speed. The resulting dope is extruded or spun to form a film or yarn by precipitation from the solvent. Precipitation can occur, for example, by deactivating the amine oxide solvent by contacting the extruded precipitate with a non-solvent, such as water.

Instead of feeding a solid precursor of a cellulose-amine-oxide-water solution to the extruder as in the above-mentioned copending application, a slurry of cellulose, amine oxide solvent and a miscible non-solvent may be added directly to the extruder where mixing takes place under pressure and heat. The miscible non-solvent may be water or a mixture of water and an organic non-solvent for cellulose miscible with the amine oxide and water. After the cellulose is swelled by the amine oxide non-solvent system, the organic non-solvent and a portion of the water are removed by a vent in the extruder under a vacuum until only the amount of water remains that is necessary to permit dissolving the cellulose in the amine oxide when elevated temperatures and pressure are applied to the mixture.

The extruder would not require venting if the precise proportions of cellulose and amine oxide-water are fed directly into the extruder.

Any suitable tertiary amine oxide which is compatible with water and with the organic liquid which is not a solvent for cellulose may be used such as, for example, those disclosed in the aforesaid patents. However, the preferred tertiary amine oxides are cyclic mono(N-methylamine-N-oxide) compounds such as, for example, N-methyl-morpholine-N-oxide, N-methylpiperidine-N-oxide, N-methylpyrrolidone-oxide, dimethylcyclohexylamine oxide, and the like.

Any suitable aprotic organic liquid non-solvent for cellulose which is miscible with water and will not react with the amine oxide may be used such as, for example, an alcohol, such as methyl alcohol, n-propyl alcohol, isopropyl alcohol, butanol and the like, toluene, xylene, dimethylsulfoxide, dimethylformamide, or the like.

The spun filament may be cooled with air, the surface of the filament wet with water to reduce its tendency to stick to adjacent filaments, and fed through a feedroller to a tension winder. The product may be washed on the spool and skein dried or it can be cut into staple fiber lengths and purified to remove all of the amine-oxide.

In the following examples, all parts and percentages are by weight unless otherwise stated.

EXAMPLE I

About 1070 grams of N-methylmorpholine-oxide containing about 25.27% water is mixed with about 200 milliliters of isopropyl alcohol and heated to 80° C. About 200 grams comminuted wood pulp is added to the resulting mixture and the resulting suspension is steeped until the wood pulp swells. About 400 milliliters of isopropyl alcohol is added and after 10 minutes the isopropyl alcohol and part of the water are removed under vacuum at 60° C. and 27 inches Hg. The water content of the cellulose-amine oxide product is 6%.

Referring now to FIG. 1, the resulting cellulose chip product containing amine oxide and water is placed in hopper 10 of extruder 11. The single screw of the extruder is operated at 20 r.p.m. with a pressure in the extruder barrel of about 2000–3000 psi. The temperature in the extruder at the hopper end is about 80° C. and increases through zones of 90° C. and 100° C. to a temperature of 120° C. in metering section 12 near the exit end of the barrel. The necessary heat may be added by conventional means, for example, by electrical resistance wires surrounding the extruder barrel or suitable jacketing for circulating hot water. The cellulose dissolves in the amine oxide and water to form a solution which is extruded through a die 13 or spinnerettes.

EXAMPLE II

Cellulose chips prepared in accordance with Example I are placed in hopper 10 of extruder 11 and are extruded at a worm speed of about 20 r.p.m. The temperature in the extruder barrel of hopper 10 is about 100° C. and is increased to 110° C. at which temperature it is maintained through the remainder of the barrel. The cellulose dissolves in the amine oxide-water mixture in the extruder and the resulting dope is extruded through a die.

The amine oxide used in practicing the invention may be prepared by oxidizing the amine as described in U.S. Pat. No. 3,333,000; U.S. Pat. No. 3,447,939 or other suitable process. For convenience, the amine oxide has been referred to herein as simply "amine oxide" but it is to be understood that the amine oxide is always a tertiary amine oxide.

EXAMPLE III

Figure 2:
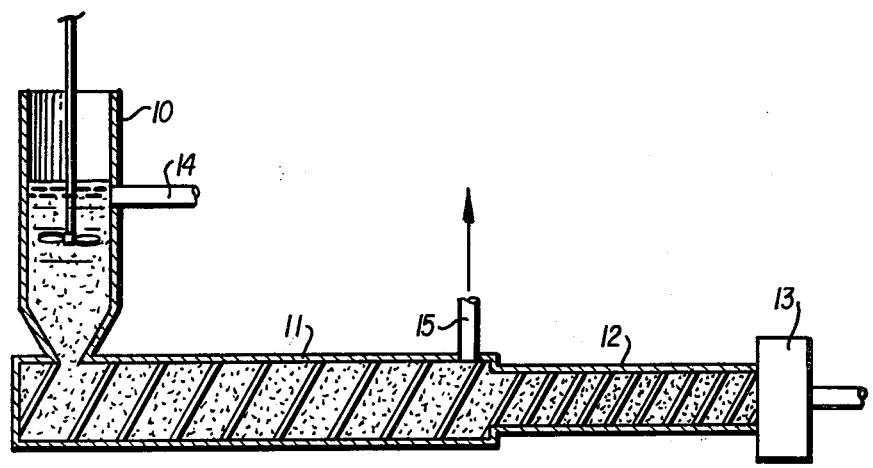
FIG. 2 shows a modification of the extruder used in the process in which the feed material may be in the form of a slurry and volatile non-solvents can be removed from the cellulose-amine oxide-water mixture before spinning or extruding.

Instead of adding chips to the extruder as in Example I, a slurry having the same amounts as Example I of the same amine oxide, water and isopropyl alcohol and non-solvent is added to an extruder similar to the one shown in FIG. 1, except that it is fitted with appropriate feed pipes, a mixing blade, and an exhaust vent. Referring to FIG. 2, the extruder of FIG. 1 is modified to the extent that an inlet pipe or conduit 14 is provided for the hopper 10 to supply liquid or slurry to the hopper 10. A stirring blade is also provided to mix the added materials or maintain the slurry. The extruder barrel 12 is heated to about 100° C. and mixing is continued in the extruder until the cellulose is swelled by the amine-oxide-water isopropyl alcohol system. When the isopropyl alcohol and excess water are removed, the cellulose will become completely dissolved in the amine oxide and water through the combination of heat, pressure, and shear in the extruder. In order to remove the isopropanol and the excess water from the solution which is prepared, a vacuum is applied to the vent 15. The resulting dope is then extruded through a spinnerette or die 13.

Although the invention is described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for making a solution of cellulose in a tertiary amine oxide which comprises dissolving solid cellulose containing a tertiary amine oxide in an extruder and extruding the resulting solution from the said extruder before significant reduction in molecular weight of the cellulose occurs.

2. The process of claim 1 wherein the amine oxide contains a non-solvent.

3. The process of claim 2 wherein the non-solvent is water.

4. The process of claim 2 wherein the non-solvent is a mixture of water and an organic non-solvent.

5. A process for making a cellulose product which comprises heating solid cellulose wet with a tertiary amine oxide in an extruder until the cellulose dissolves, and extruding the resulting solution from the said extruder before significant reduction in molecular weight of the cellulose occurs.

6. The process of claim 5 wherein the amine oxide contains a non-solvent.

7. The process of claim 6 wherein the non-solvent is water.

8. The process of claim 5 wherein the non-solvent is a mixture of water and an organic non-solvent.

9. The process of claim 5 wherein pressure and shear are applied to the solid cellulose.

10. The process of claim 1 wherein said solid cellulose is cellulose impregnated with amine oxide and water.

11. The process of claim 2 wherein said solid cellulose is a solution of cellulose in said amine-oxide-non-solvent.

12. The process of claim 2 wherein said cellulose and said tertiary amine are added directly to said extruder.

13. A process for making a shaped cellulose product which comprises charging cellulose having tertiary amine oxide absorbed thereon to the barrel of an extruder at a temperature below that at which the said tertiary amine oxide will dissolve the cellulose, heating in the barrel of the extruder the said cellulose containing absorbed tertiary amine oxide to a temperature where the cellulose will dissolve in the said absorbed amine to form an extrudable solution, and extruding the resulting extrudable solution from the said extruder through a die to form a tertiary amine oxide-cellulose product before significant reduction in molecular weight of the cellulose occurs.

14. The process of claim 1 wherein the cellulose is added to the extruder while suspended in a solvent therefor containing a tertiary amine oxide and water.

15. The process of claim 1 wherein the said solvent contains a tertiary amine oxide and an organic non-solvent for cellulose which is inert chemically with the tertiary amine oxide and is miscible with water.

16. A process for making a shaped cellulose product which comprises dissolving cellulose in a tertiary amine oxide solvent therefor in an extruder, extruding the resulting solution and precipitating the cellulose from the shaped solution substantially immediately after extrusion and before significant reduction in molecular weight of the cellulose, and drying the precipitated cellulose.

* * * * *